(12) United States Patent
Motta

(10) Patent No.: US 7,318,139 B2
(45) Date of Patent: Jan. 8, 2008

(54) SYSTEM FOR HARDWARE ASSISTED FREE LIST MANAGEMENT

(75) Inventor: Frank Motta, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 179 days.

(21) Appl. No.: 10/356,671

(22) Filed: Jan. 31, 2003

(65) Prior Publication Data
US 2004/0153617 A1    Aug. 5, 2004

(51) Int. Cl.
*G06F 12/06* (2006.01)
(52) U.S. Cl. ........................ 711/170; 711/221
(58) Field of Classification Search ................ 711/154, 711/170, 152, 221; 710/45
See application file for complete search history.

(56) References Cited

U.S. PATENT DOCUMENTS

| | | | | |
|---|---|---|---|---|
| 5,784,699 A | * | 7/1998 | McMahon et al. | 711/171 |
| 5,802,278 A | * | 9/1998 | Isfeld et al. | 709/249 |
| 6,611,906 B1 | * | 8/2003 | McAllister et al. | 711/168 |

* cited by examiner

*Primary Examiner*—Pierre-Michel Bataille
(74) *Attorney, Agent, or Firm*—Patterson & Sheridan, LLP

(57) ABSTRACT

A system uses specialized software instructions for efficient management of freelists. In a preferred embodiment, special load and store instructions are provided. The load instruction is mapped to a register or memory location. When the load instruction is performed, hardware uses a bit-map free slot map to return an index of a free slot. Similarly, the store instruction is used to release, or free, a slot. The store instruction allows software to specify an index of a slot to be freed.

4 Claims, 4 Drawing Sheets

```
#define FREELIST_SIZE 32
#define FREEVALUE 0
#define LOCKEDVALUE 1
int freelist [FREELIST_SIZE] = {0};
#define NONEFREE -(FREELIST_SIZE)

int getFreeElement (void) {
    int i = 0;
    while (freelist[i] != FREEVALUE && i < FREELIST_SIZE-1)
        i++;
    if (i < FREELIST_SIZE || freelist[i] == FREEVALUE) {
        ENTER_CRITICAL_SECTION();
        freeList[i] = LOCKEDVALUE;
        EXIT_CRITICAL_SECTION();
        return(i);
    }
    return(NONEFREE);
}
```

FIG. 3

| SEQUENCE | OPERATION | CONTENT AT OPERATION | CONTENT AFTER OPERATION | VALUE PULLED OFF BUS |
|---|---|---|---|---|
| 1 | LOAD | 0 | 1 | 1 |
| 2 | LOAD | 1 | 3 | 2 |
| 3 | LOAD | 3 | 7 | 3 |
| 4 | STORE 2 | 7 | 5 | - |
| 5 | LOAD | 5 | 7 | 2 |
| 6 | LOAD | 7 | 15 | 4 |
| 7 | LOAD | 15 | 31 | 5 |
| 8 | LOAD | 31 | 63 | 6 |
| 9 | LOAD | 63 | 127 | 7 |
| 10 | LOAD | 127 | 255 | 8 |
| 11 | LOAD | 255 | 255 | 0 (NONE AVAILABLE) |
| 12 | STORE 5 | 255 | 239 | - |
| 13 | STORE 6 | 239 | 207 | - |
| ... | | | | |

SYSTEM FOR HARDWARE ASSISTED FREE LIST MANAGEMENT

BACKGROUND OF THE INVENTION

This invention relates in general to digital data processing and more specifically to accessing, tracking and managing free slots in a list in computer memory.

One basic operation performed often in many of today's computer applications includes keeping track of available memory portions, or "slots." A slot can be any portion of memory such as, e.g., a byte, word, block of words, data structure, etc. One common way of keeping track of slots is to use a list. A list is, in general, a series of slots or, typically, a list of pointers or flags corresponding to slots. Typically, the slots are adjacent to each other to form a contiguous block of memory. However, some approaches allows slots to be distributed in different parts of memory.

FIG. 1A illustrates slots in a list.

In FIG. 1A, list 10 represents 8 consecutive memory portions. Each portion is a slot with an index from 0-7. List 10 represents the list at time t1. List 20 represents the same list at a later time, t2. Shaded slots indicate slots that have been allocated. Allocated slots are those that are being used by a process such as an application program, operating system, task, or other process. Allocated slots are not currently free to be allocated for another process. The difference between the lists at times t1 and t2 is that slot 2 has been allocated at time t2 whereas it was free at time t1. When a slot is allocated the slot is also set to be "locked."

Slots can be allocated so that they are provided to a process and locked from use by other processes. Subsequently, slots can be made free, or unlocked, so that they are again available for use by a process. The ability to lock and unlock (i.e., allocate or deallocate) slots is performed often and can be critical to performance of a computer program, especially where the number of slots is large and slots are needed frequently.

In FIG. 1A, list 30 at time t3 is another snapshot of the slot list. At time t3, list 30 now has slots 2, 3, 4, 6 and 7 allocated while slots 0, 1 and 5 are free. Note the changing allocations of slots among the list at times t1, t2 and t3 is arbitrary. At any point in time, depending on process needs, slots can be free or allocated.

The prior art uses several techniques to manage lists of slots. One approach is to use a "freelist." The freelist is typically an array that indicates whether or not slots are free or allocated. An example of a freelist index array is shown in FIG. 1B. In FIG. 1B, array 40 has a first element at address FREELIST. The array is indexed by providing an offset to the base address, FREELIST. Another variable is FREELIST_SIZE. FREELIST_SIZE is a constant that is the number of slots in FREELIST.

An example of code that manages the FREELIST of FIG. 1B is shown in FIG. 1C. As is known in the art, the code shown in FIG. 1C will return the index to the first free slot as indicated by the values in FREELIST. For example, referring to the list at t1 of FIG. 1A, the routine getFreeElement returns the value 2 since the first free slot in the list (counting from zero upwards) is slot 2. Likewise, if getFreeElement is called at time t2, when the list exists as shown by list 20, getFreeElement returns the value 4. This return index value is used by a process to access the free slot.

A function called releaseElement is used to release slots. A process calls releaseElement with an index of a slot to deallocate. The routine releaseElement sets an indication in FREELIST that the slot corresponding to the index is now free for reallocation.

It should be apparent that the approach described here using the FREELIST and consecutive researching through a freelist for free slots is very time consuming. This approach requires looping with an index through the FREELIST until a first free slot is found. In applications where slots are frequently allocated and deallocated, this approach is prohibitive. Also, if the number of slots is large, the FREELIST can take up a non-trivial amount of memory.

Since the status of a slot can only take on one of two values, i.e., free or locked, the FREELIST can be made up of single-bit values. FIG. 1D illustrates the case where single bits in a word of memory are used to indicate the status of slots. In FIG. 1D, a "one" value in a bit position indicates that a slot is locked, or allocated. A "zero" value in a bit position indicates that the slot is free. FIG. 1D corresponds to list 10 of FIG. 1A. Naturally, the list, slot, FREELIST_SIZE and number of indexes, and other parameters can be of any number, size, type, etc.

Although packing the FREELIST indicators into single bit positions is space-efficient, it causes even more overhead in managing the FREELIST. This is because bit manipulation such as masking, shifting, converting, etc. are necessary to successfully check a bitmapped freelist and return an index. Although many computer systems provide specialized instructions for doing bit manipulations, the use of these instructions still presents a considerable overhead to freelist management.

One problem with a bit mapped freelist is that most computers operate on digital data in an arithmetic mode where bit positions are converted to, and correspond to, binary values. FIG. 1D shows bit values at the top of word 50, while bit positions are shown below the word. Converting arithmetic bit value numbers to bit position values and freelist indexes is time-consuming.

Other approaches for list management include the use of single, or double-linked list, stack, keeps, etc. All of these approaches include drawbacks either by increasing the memory space required to support these schemes, or in central processing unit (CPU) cycles to perform additional processing to manage the system.

BRIEF SUMMARY OF THE INVENTION

The present invention provides hardware assistance to implement specialized software instructions for efficient management of freelists. In a preferred embodiment, special load and store instructions are provided. The load instruction is mapped to a register or memory location. When the load instruction is performed, hardware uses a bit-map free slot map to return an index of a free slot. Similarly, the store instruction is used to release, or free, a slot. The store instruction allows software to specify an index of a slot to be freed.

With the approach of the present invention, there is very little processing overhead in obtaining, locking, and releasing, slots. From a programming point of view, slot indexes are obtained easily and efficiently with the load command and are released, simply, with the store command.

In one embodiment the invention provides a method for obtaining an index value to a free slot in a digital processing system, the method comprising using hardware assist circuitry to provide the index value.

BRIEF DESCRIPTION OF THE DRAWINGS

FIG. 3 illustrates several examples of Load and Store instructions;

DETAILED DESCRIPTION OF THE PREFERRED EMBODIMENTS

Figure 1A:
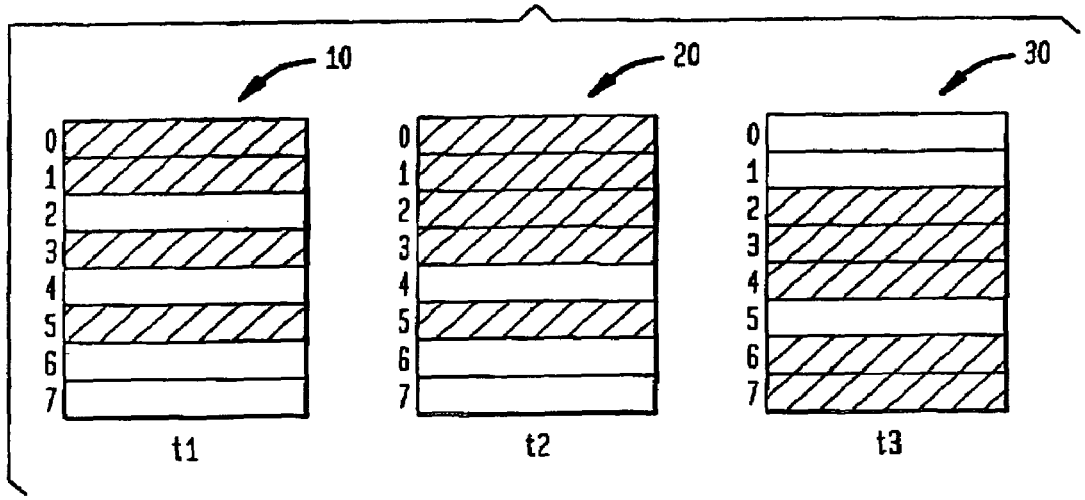
FIG. 1A illustrates slots used in a list.
Figure 1B:
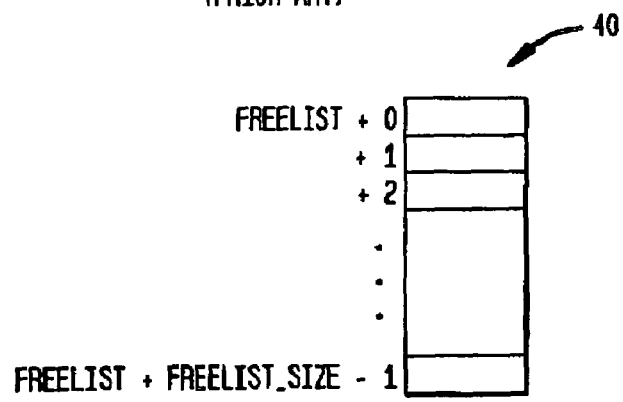
FIG. 1B shows a freelist index array.
Figures 1C, 1D:
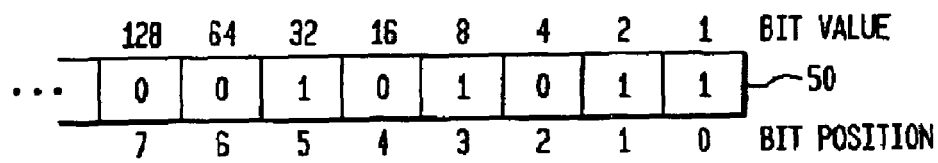
FIG. 1C shows an example of code that manages a freelist.
FIG. 1D illustrates A bit-mapped index array.
Figure 2:
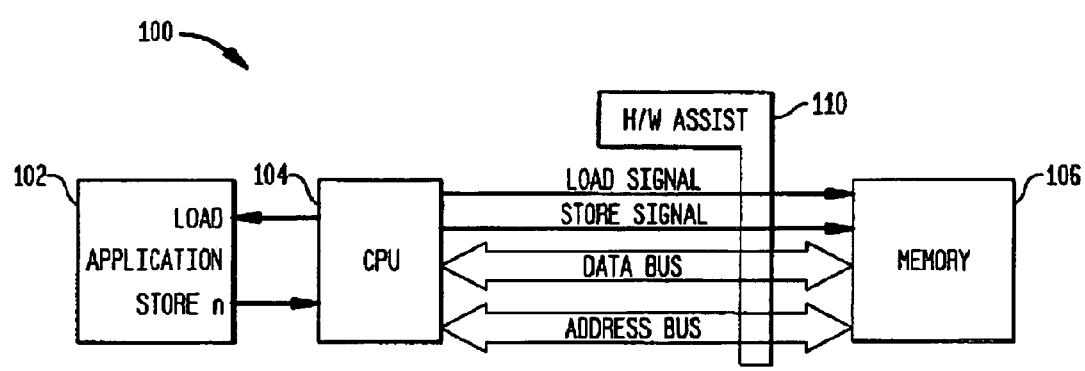
FIG. 2 illustrates signals of a system using the load and store instructions of the present invention.

FIG. 2 illustrates a basic application of the invention in a general-purpose computing environment. In FIG. 2 system 100 uses CPU 104 to execute software such as application program 102. Application program 102 can be any type of process, or task, including operating system, firmware, application program, device driver, kernel, microcode, etc. instructions.

Although the invention is discussed primarily with respect to a general purpose computer embodiment, any type of processing environment can be used with the invention. For example, application specific integrated circuits (ASICs), field-programmable gate array (FPGA), dedicated circuitry, etc. or combinations of these can be used to achieve a processing environment suitable for use with the invention. Any type of processing architecture is adaptable for use with the invention.

CPU 104 uses buses and signal lines such as LOAD SIGNAL, STORE SIGNAL, DATA BUS, and ADDRESS BUS to communicate with memory 106. Note that types of buses and signals can vary from those shown in FIG. 2. Some implementations of the invention may use different signals and buses, may omit some of the buses, add additional buses, may omit some of these communication paths, may add communication paths, or use other approaches.

Hardware assist circuitry 110 monitors the signals and buses and can intercept the signals to implement Load and Store instructions according to the present invention. A preferred embodiment of the invention uses a "memory map" approach. In other embodiments other approaches can be used. The hardware assist circuitry described herein need not only monitor exchanges between the CPU and memory. For example, CPU use of CPU-internal registers can be monitored. Transfers between the CPU or any other device such as direct memory access (DMA), input/output (I/O), or communication with other external or internal devices or subsystems can be monitored by hardware assist circuitry 110. The hardware assist circuitry can be located at any suitable point, device, component or position within a processing device, such as a single chip computer, multi-chip chipset, etc.

Using the memory map approach, the Load and Store instructions can use an address operand wherein a pre-designated address value invokes the special instructions dealing with list management. For example, a memory location such as x0800, when accessed by load and store instructions, can invoke the specialized Load and Store commands whereas accessing other memory addresses with standard load and store operations will not result in invoking the hardware assist circuitry. Other approaches can use other types of instructions and addressing to invoke the list management logic described herein.

Hardware assist circuitry 110 is used to return an index of a free slot in a freelist in response to a load instruction, and to update a freelist slot status upon detecting an appropriate store instruction. A preferred embodiment of the invention uses a single bit to correspond with a slot status. In other words, the status of a bit at a given bit position in a given word in the FREELIST corresponds to a predefined slot. Note that variations of the invention are possible. For example, multiple bits, or bytes, words, etc., can be used to indicate status and provide control over freelist slots and slot management.

FIG. 3 illustrates several examples of Load and Store instructions and consequent bit mapped and index values.

In FIG. 3, sequence 1 shows a load operation performed when the bitmap associated with the a freelist is all zeroes. The load instruction returns a "1" as the index of a free slot to be used by the process executing the load instruction. The value of the bitmap is set to 1. In other words, a 1 is set in bit position 0 of a memory word, data register, or other mechanism used to keep track of the freelist bit indexes. Since bit position 0 corresponds to slot 1, hardware assisted circuitry 110 returns a data value of 1 to the application program. The application program then uses the value, 1, as an index to access a slot.

The preferred embodiment starts numbering the slots at 1, rather than 0, so that 0 can be reserved to indicate an error condition. Note that other embodiments of the invention can use other slot numbering, including indexing starting at 0.

In FIG. 3, a second example is given as sequence 2 where a load operation is performed when the content of the freelist index bit map is a 1. This results in a value of 2 being provided to the application program. This is because the next available free slot in the list is the second slot, indexed with a value of 2 (in the preferred embodiment). This results in setting the content of the freelist bit map to a binary word value of 3. Similarly, other examples of load operations being performed with differing values of the freelist bit map values are shown as different sequence steps.

In the present example, 8 slots are handled using an 8-bit bitmap. This causes an error condition when more than 8 slots are needed by processes. To illustrate the error condition, sequence 11 shows a load attempted with a freelist index bit map value of 255 to result in an error value of 0 returned, thus indicating to a calling process that no slots are available. Sequence 4 illustrates a store example where a slot having index value of 2 is freed by a calling process. Since slots 1, 2 and 3 had previously been allocated, the content of the free list includes bit positions 0, 1 and 2 set, corresponding to a content value of 7. The instruction "store 2" causes slot to be freed, or deallocated. Slot 2 corresponds to bit position 1 and digital bit value of 2. Thus, the content of the freelist index word after operation deallocating slot 2 is a value 5, corresponding to a 1 in bit position 0, 0 in bit position 2, 1 in bit position 2 and 0 s in all other bit positions. Note that this approach can be extended to any number of bits. The bits can be organized as bytes, words, register files, etc.

In general, any organization of bits in any hardware device, or mechanism, is possible. Some embodiments may use more than one bit to indicate the status of slots. When one or more bits is used, digital properties of the slots can be indicated. For example, a bit can be used to indicate whether a slot is currently being accessed by another program (i.e., is being shared).

With a memory mapped scheme, different lists can be handled by different address designations. An example is where a load to address x0800 can cause Load and Store instructions to correspond to a first list. Load and Store instructions naming address x0801 can relate to a second list, and so on.

In addition to the load and store instructions, additional hardware assisted instructions dealing with list management can be implemented. For example, a "garbage collection" instruction can be used of the format "collect xADDR". Wherein the address "xADDR" designates the list of slots to be compacted so that all free slots are grouped into more contiguous arrangements.

Although the invention has been described with respect to specific embodiments, thereof, these embodiments are merely illustrative, and not restrictive of the invention. The invention is to be determined solely by the appended claims.

What is claimed is:

1. In a program running a CPU, a method for obtaining an index value to a free slot in a digital processing system, the method comprising:

detecting a load instruction between the CPU and at least one predetermined memory location;

monitoring signals between the CPU and a memory to detect the occurrence of a first signal; and upon the occurrence of said first signal, obtaining the contents of the at least one predetermined memory location, at least one bit of the predetermined memory location being an index value to a next available free memory slot that is located elsewhere in said memory, wherein the step of obtaining comprises:

decoding an address, comparing the decoded address to a predetermined first address value, and if the decoded address value is equal to the first predetermined address value, then providing the index value to the program.

2. The method of claim 1, wherein the first signal includes a load signal.

3. The method of claim 1, wherein the memory includes a register in a central processing unit (CPU).

4. The method of claim 1, further comprising using the index value in an application program.

* * * * *